United States Patent
Tajima et al.

(10) Patent No.: US 7,744,781 B2
(45) Date of Patent: Jun. 29, 2010

(54) CONDUCTIVE THERMOPLASTIC ELASTOMER COMPOSITION, METHOD OF PRODUCING SAME, AND MOLDING

(75) Inventors: Kei Tajima, Hyogo (JP); Hideyuki Okuyama, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 178 days.

(21) Appl. No.: 11/882,711

(22) Filed: Aug. 3, 2007

(65) Prior Publication Data

US 2008/0042108 A1 Feb. 21, 2008

(30) Foreign Application Priority Data

Aug. 16, 2006 (JP) ............... 2006-221858
Aug. 16, 2006 (JP) ............... 2006-221908

(51) Int. Cl.
 *H01B 1/12* (2006.01)
 *H01B 1/02* (2006.01)
 *C08F 8/00* (2006.01)
 *C08G 18/42* (2006.01)
 *G03G 15/08* (2006.01)

(52) U.S. Cl. ............... 252/519.33; 252/521.5; 524/500; 525/191; 399/279

(58) Field of Classification Search ............ 252/519.33, 252/521.5; 524/500; 525/191; 399/279
See application file for complete search history.

(56) References Cited

U.S. PATENT DOCUMENTS

| 5,175,211 A | 12/1992 | Sanada et al. |
| 2004/0105983 A1 | 6/2004 | Hattori et al. |
| 2004/0135129 A1 | 7/2004 | Hattori et al. |
| 2004/0220301 A1 * | 11/2004 | Hattori et al. ............... 524/155 |

FOREIGN PATENT DOCUMENTS

| EP | 1 439 203 A1 | 7/2004 |
| JP | 8-183866 A | 7/1996 |
| JP | 11-323145 A | 11/1999 |
| JP | H11-323145 | * 11/1999 |
| JP | 2004-189883 A | 7/2004 |
| JP | 2004-189884 A | 7/2004 |
| JP | 2004-272209 A | 9/2004 |
| WO | WO-98/26004 A1 | 6/1998 |

* cited by examiner

*Primary Examiner*—Mark Kopec
*Assistant Examiner*—Jaison P Thomas
(74) *Attorney, Agent, or Firm*—Birch, Stewart, Kolasch & Birch, LLP (57) ABSTRACT

A conductive thermoplastic elastomer composition comprising a component (A) containing a thermoplastic resin or/and a thermoplastic elastomer; a component (B) comprising an ionic-conductive agent containing an ethylene oxide-propylene oxide copolymer or/and an ethylene oxide-propylene oxide-allyl glycidyl ether copolymer and a metal salt contained in the ethylene oxide-propylene oxide copolymer or/and the ethylene oxide-propylene oxide-allyl glycidyl ether copolymer; and a component (C) comprising an ethylene-acrylic ester-maleic anhydride copolymer.

9 Claims, 1 Drawing Sheet

CONDUCTIVE THERMOPLASTIC ELASTOMER COMPOSITION, METHOD OF PRODUCING SAME, AND MOLDING

This nonprovisional application claims priority under 35 U.S.C. §119(a) on Patent Application No(s). 2006-221858 and 2006-221908 filed in Japan on Aug. 16, 2006, the entire contents of which are hereby incorporated by reference.

BACKGROUND OF THE INVENTION

1. Field of the Invention

The present invention relates to a conductive thermoplastic elastomer composition, a method of producing the conductive thermoplastic elastomer composition, and a molding formed by processing the conductive thermoplastic elastomer composition. More particularly, the present invention relates to a conductive thermoplastic elastomer composition which is effectively used as a conductive roller for use in an image-forming apparatus such as a copying machine, a printer, a facsimile, and the like.

2. Description of the Related Art

As methods of imparting conductivity to an elastomer, the following two methods are conventionally used: In one known method, an electroconductive polymer composition containing a conductive filler such as powder of metal oxide, carbon black or the like in a polymer thereof is used. In the other known method, an ionic-conductive polymer composition such as urethane rubber, acrylonitrile butadiene rubber, epichlorohydrin rubber or the like is used.

In the case where the electroconductive polymer composition is used to compose a conductive roller, there is a region in which an electric resistance changes rapidly owing to a slight change of the addition amount of the conductive filler. Thus it is very difficult to control the electric resistance of the conductive roller. In addition, because it is difficult to uniformly disperse the conductive filler in the polymer, an electric resistance value has variations in the circumferential and widthwise directions of the conductive roller.

The electric resistance value of the conductive roller using the electroconductive polymer composition depends on a voltage applied thereto. In particular, in the case where the carbon black is used as the conductive filler, the electric resistance value of the conductive roller depends greatly on the voltage applied thereto. Further when the electroconductive polymer composition contains a very large amount of the conductive filler such as the carbon black, it is difficult to mold the electroconductive polymer composition.

The conductive roller using the electroconductive polymer composition has the above-described problems. In recent years, a high-quality image forming technique including a digital image processing technique and color image processing technique is outstanding. Thus there is a tendency that the ionic-conductive polymer composition is used preferentially to the electroconductive polymer composition.

Most of the ionic-conductive polymer composition used to form the conductive roller consists of a vulcanized rubber composition. But the vulcanized rubber composition is not thermoplastic and cannot be recycled.

Such being the case, an ionic-conductive polymer which is thermoplastic and can be recycled has come to be used. Above all, the conductive roller using epichlorohydrin rubber has a low electric resistance value and preferable properties. But in some cases, the ionic-conductive thermoplastic elastomer such as the epichlorohydrin rubber containing chlorine generates a toxic gas such as hydrogen chloride and dioxine when it is discarded.

In Japanese Patent Application Laid-Open No. 8-183866, there is disclosed the sheet-shaped thermoplastic elastomer composed of the olefin thermoplastic elastomer to which the permanent antistatic agent is added. The sheet-shaped thermoplastic elastomer can be recycled. Further because the olefin thermoplastic elastomer does not contain chlorine, the sheet-shaped thermoplastic elastomer does not pollute environment when it is discarded. In addition, a thermoplastic elastomer of a bleeding type containing the conductive plasticizer as the antistatic agent is also disclosed.

The permanent antistatic agent contained in the sheet-shaped thermoplastic elastomer is capable of decreasing the surface electric resistance value thereof, but does not decrease the volume resistivity thereof and causes the electric resistance thereof value to become high. Further the sheet-shaped thermoplastic elastomer has a high compression set. Thus a conductive roller composed of the sheet-shaped thermoplastic elastomer does not have favorable properties.

The thermoplastic elastomer of the bleeding type has a low mechanical property and a high compression set. In addition the plasticizer contained in thermoplastic elastomer bleeds and greatly pollutes other parts such as a photoreceptor. Therefore the thermoplastic elastomer cannot be used as a component part of an image-forming apparatus such as a copying machine, a printer, and the like.

The present applicant developed conductive thermoplastic elastomers having a semiconductive electric resistance value and favorable mechanical properties, for example, a low compression set. More specifically, as disclosed in Japanese Patent Application Laid-Open No. 2004-189884 (patent document 2) and Japanese Patent Application Laid-Open No. 2004-272209 (patent document 3), the present applicant proposed the conductive thermoplastic elastomer containing the polymer represented by the polyether polymer and the conductive salt contained in the thermoplastic elastomer.

But there is room for improvement in the conductive thermoplastic elastomer so that it enhances the dispersibility of the components thereof to a higher extent and prevents the properties thereof from being deteriorated and the conductive thermoplastic elastomer from defectively molded owing to the insufficient dispersibility of the components thereof.

Disclosed in Japanese Patent Application Laid-Open No. 2004-189883 (patent document 4) is the compatibilizing agent containing at least one of the acid-modified EPDM and the acid-modified hydrogenated styrene thermoplastic elastomer to finely disperse the polyamide resin in the dynamically crosslinked thermoplastic elastomer. But in the patent document 4, investigations were not made on whether the compatibilizing agent is effective for finely dispersing components, other than the polyamide resin, such as the conductive salt in the thermoplastic elastomer. In the patent document 4, no description or suggestion was made on compatibilizing agents other than the above-described compatibilizing agent.

Japanese Patent Application Laid-Open No. 8-183866
Japanese Patent Application Laid-Open No. 2004-189884
Japanese Patent Application Laid-Open No. 2004-272209
Japanese Patent Application Laid-Open No. 2004-189883

SUMMARY OF THE INVENTION

The present invention has been made in view of the above-described problems. Therefore it is an object of the present invention to provide a conductive thermoplastic elastomer composition which has rubber-like elasticity and flexibility, has resin-like favorable moldability and can recycled, is excellent in dispersibility of components contained therein, and thus has excellent mechanical property and fine finish in processing; a method of producing the conductive thermoplastic elastomer composition, and a molding such as a conductive roller composed of the conductive thermoplastic elastomer composition.

To achieve the object, according to the invention, there is provided a conductive thermoplastic elastomer composition comprising a component (A) containing a thermoplastic resin or/and a thermoplastic elastomer; a component (B) comprising an ionic-conductive agent containing an ethylene oxide-propylene oxide copolymer or/and an ethylene oxide-propylene oxide-allyl glycidyl ether copolymer and a metal salt contained in the ethylene oxide-propylene oxide copolymer or/and the ethylene oxide-propylene oxide-allyl glycidyl ether copolymer; and a component (C) comprising an ethylene-acrylic ester-maleic anhydride copolymer.

The present inventors have found that when the content (B) comprising the ionic-conductive agent contains the metal salt used to decrease the electric resistance value of the conductive thermoplastic elastomer composition, together with the EO-PO copolymer or/and the EO-PO-AGE copolymer, the EO-PO copolymer or/and the EO-PO-AGE copolymer stabilize ions deriving from the metal salt and provides an outstanding effect of decreasing the electric resistance value thereof.

As a result of their further investigations, they have confirmed that when the component (B) containing the EO-PO copolymer or/and the EO-PO-AGE copolymer is added to the component (A) comprising the base polymer containing the thermoplastic resin or/and the thermoplastic elastomer, the dispersibility of the EO-PO copolymer or/and that of the EO-PO-AGE copolymer are insufficient in some cases and that when the mixture of the component (A) and the component (B) is extruded in the shape of a roller in this state, marks of stripes are generated on the surface of the roller owing to the separation of the components of the conductive thermoplastic elastomer composition in some cases. To solve the problem that there is room for improvement in more finely dispersing the EO-PO copolymer or/and the EO-PO-AGE copolymer in the component (A) comprising the base polymer, the present inventors have made further experiments and investigations. As a result, they have found that by adding the ethylene-acrylic ester-maleic anhydride copolymer to the component (A) comprising the base polymer, it is possible to finely disperse the copolymers in the component (A) comprising the base polymer and obtain the conductive thermoplastic elastomer composition having an excellent dispersibility. Based on the finding, the present inventors have completed the present invention.

Initially the component (A) comprising the base polymer containing the thermoplastic resin or/and the thermoplastic elastomer is described in detail below.

As the thermoplastic elastomer contained in the component (A), known thermoplastic elastomers can be used.

More specifically, it is possible to use a styrene thermoplastic elastomer, a vinyl chloride-based thermoplastic elastomer, an olefin thermoplastic elastomer, an urethane thermoplastic elastomer, an ester thermoplastic elastomer, and an amide thermoplastic elastomer. It is especially preferable to use the styrene thermoplastic elastomer.

As the thermoplastic resin contained in the base polymer, it is possible to use known thermoplastic resin. It is possible to exemplify olefin resin; polyester resin such as polyethylene terephthalate (PET) or polybutylene terephthalate (PBT); polystyrene (PS); and nylon. It is especially preferable to the olefin resin.

Of the thermoplastic resin or/and the thermoplastic elastomers contained in the component (A), it is preferable to use a mixture of the styrene thermoplastic elastomer and the olefin resin.

As the styrene thermoplastic elastomer, it is possible to exemplify a copolymer block composed of a polymer block (A) containing a styrene monomer as its main component and a block (B) containing a conjugated diene compound as its main component and a hydrogenated conjugated diene polymer unit of the block copolymer. As the styrene monomer, it is possible to list styrene, α-methylstyrene, vinyl toluene, and t-butylstyrene. These styrene monomers can be used singly or in combination of not less than two kinds thereof. It is especially preferable to use the styrene as the styrene monomer. As the conjugated diene compound, it is possible to list butadiene, isoprene, chloroprene, and 2,3-dimethylbutadiene. These conjugated diene compounds may be used singly or in combination of not less than two kinds thereof.

It is preferable to use a hydrogenated styrene thermoplastic elastomer as the styrene thermoplastic elastomer.

The hydrogenated styrene thermoplastic elastomer is saturated with double bonds and has a low hardness, a large coefficient of friction, a low compressive strain, and a high durability. When the dynamically crosslinked thermoplastic elastomer composition which is described below is used as the base polymer, the hydrogenated styrene thermoplastic elastomer serving as the matrix does not react with the crosslinking agent and hence is not dynamically crosslinked. Thus it is preferable to use the hydrogenated styrene thermoplastic elastomer because it does not inhibit the crosslinking of the rubber component and allows the dynamically crosslinked elastomer composition to display a desired plasticity.

As the styrene thermoplastic elastomer, it is possible to list a styrene-butadiene-styrene copolymer (SBS), a styrene-isoprene-styrene copolymer (SIS), a styrene-ethylene/butylene-styrene copolymer (SEBS), a styrene-ethylene/propylene-styrene copolymer (SEPS), and a styrene-ethylene-ethylene/propylene-styrene copolymer (SEEPS).

It is especially preferable to use the styrene-ethylene-ethylene/propylene-styrene copolymer (SEEPS).

As the olefin resin, it is possible to list polyethylene, polypropylene, ethylene ethyl acrylate resin, ethylene vinyl acetate resin, ethylene-methacrylate resin, ionomer resin, and chlorinated polyethylene. Of these olefin resins, it is favorable to use the polypropylene or the polyethylene. It is more favorable to use the polypropylene because it is compatible.

In mixing the thermoplastic elastomer and the thermoplastic resin of the component (A) with each other, it is possible to determine an appropriate mixing ratio according to an elastomer and a resin to be used. It is preferable to use not less than 1 nor more than 100 parts by mass of the thermoplastic resin for 100 parts by mass of the thermoplastic elastomer.

The above-described range is set for the following reason: If the mixing amount of the thermoplastic resin is less than one part by mass, the effect of mixing the thermoplastic resin with the thermoplastic elastomer cannot be obtained. For example, it is impossible to improve the processability. On the other hand, if the mixing amount of the thermoplastic resin is more than 100 parts by mass, a molding has a high hardness.

The lower limit value of the mixing amount of the thermoplastic resin for 100 parts by mass of the thermoplastic elastomer is set to favorably not less than 5 parts by mass, more favorably not less than 10 parts by mass, and most favorably not less than 20 parts by mass. The upper limit value of the mixing amount of the thermoplastic resin for 100 parts by mass of the thermoplastic elastomer is set to favorably not more than 80 parts by mass, more favorably not more than 70 parts by mass, and most favorably not more than 60 parts by mass.

It is especially preferable to use the component (A) comprising the base polymer as the thermoplastic elastomer composition in which the crosslinkable rubber or/and the thermoplastic elastomer are dynamically crosslinked and dispersed in the thermoplastic resin or/and the thermoplastic elastomer.

The thermoplastic resin or/and the thermoplastic elastomer serving as the matrix of the conductive thermoplastic elastomer composition are as described above. Known thermoplastic resins can be used, but the olefin resin is preferable. Known thermoplastic elastomers can be used, but it is favorable to use the styrene thermoplastic elastomer. It is more favorable to use a mixture of the styrene thermoplastic elastomer and the olefin resin.

As the crosslinkable rubber, it is preferable to list ethylene-propylene-diene rubber (EPDM), butyl rubber (IIR), halogenated butyl rubber (X-IIR), acrylonitrile-butadiene rubber (NBR), acrylic rubber, a bromized isobutylene-p-methylstyrene copolymer which is formed by bromizing a copolymer of isobutylene and p-methylstyrene, fluororubber, silicone rubber, chloroprene rubber (CR), natural rubber (NR), butadiene rubber (BR), styrene-butadiene rubber (SBR), isoprene rubber (IR), ethylene propylene rubber, hydrogenated nitrile rubber (HNBR), and chlorosulfonated polyethylene rubber.

These crosslinkable rubbers can be used singly or a mixture of two or more of these crosslinkable rubbers.

As the crosslinkable thermoplastic elastomers, it is possible to use a styrene-isoprene-styrene copolymer, a styrene-butadiene-styrene copolymer, and a styrene-vinylisoprene-styrene copolymer.

As the crosslinkable rubber or/and the thermoplastic elastomer composition, it is preferable to use one or more rubber components selected from the group consisting of EPDM, butyl rubber, halogenated butyl rubber, acrylonitrile butadiene rubber, acrylic rubber, bromized isobutylene-p-methylstyrene copolymer, fluororubber, and silicone rubber.

It is especially preferable to use the EPDM. The main chain of the EPDM comprises saturated hydrocarbon and does not contain double bonds. Thus even though the EPDM is exposed to high-concentration ozone atmosphere or irradiated with light for a long time, the molecular main chain is hardly cut off. Therefore the conductive thermoplastic elastomer composition of the present invention has improved resistance to ozone, ultraviolet rays, and heat. It is preferable to singly use the EPDM. When the EPDM and the above-described other rubbers are blended with each other, the ratio of the EPDM to the entire crosslinkable rubber is set to favorably not less than 50 mass % and more favorably not less than 80 mass %.

It is favorable to mix not less than 50 parts by mass nor more than 500 parts by mass of the crosslinkable rubber or/and the thermoplastic elastomer for 100 parts by mass of the thermoplastic resin or/and the thermoplastic elastomer. If the mixing ratio of the crosslinkable rubber or/and the thermoplastic elastomer is less than 50 parts by mass, the wear resistance and compression set of the conductive thermoplastic elastomer composition are liable to deteriorate. On the other hand, if the mixing ratio of the crosslinkable rubber or/and the thermoplastic elastomer is more than 500 parts by mass, the ratio of the resin component is so small that it is difficult to disperse the crosslinkable rubber or/and the thermoplastic elastomer in the thermoplastic resin or/and the thermoplastic elastomer and knead the components at a dynamic crosslinking step. The mixing amount of the crosslinkable rubber or/and the thermoplastic elastomer is more favorably not less than 100 parts by mass nor more than 500 parts by mass.

To dynamically crosslink the crosslinkable rubber or/and the thermoplastic elastomer, normally a crosslinking agent is used. Although it is possible to use a known crosslinking agent such as a resinous crosslinking agent or peroxides, it is preferable to use the resinous crosslinking agent.

The resinous crosslinking agent is synthetic resin by which the rubber or the thermoplastic elastomer has a crosslinking reaction by heating them. Compared with sulfur and a vulcanization accelerator which are used in combination, the resinous crosslinking agent is preferable in that the rubber or the thermoplastic elastomer hardly blooms, has a low compression set, deteriorates to a low degree in the properties thereof, is excellent in maintaining accuracy, and is durable. Further the resinous crosslinking agent allows the crosslinking period of time to be shorter than that required in a sulfur crosslinking agent. Thus the resinous crosslinking agent allows the dynamic crosslinking to proceed in a short period of time in an extruder.

As the resinous crosslinking agents, phenol resin, melamine-formaldehyde resin, triazine•formaldehyde condensate, hexamethoxymethyl•melamine resin can be used. The phenolic resin is especially more favorable than any of the above-described resinous crosslinking agents.

As examples of the phenolic resin, it is possible to use phenolc resins synthesized by reaction of phenols such as phenol, alkylphenol, cresol, xylenol, and resorcin with aldehydes such as formaldehyde, acetic aldehyde, and furfural. It is possible to use halogenated phenol resin having at least one halogen atom connected to the aldehyde unit of the phenol resin.

It is preferable to use alkylphenol•formaldehyde resin resulting from reaction of the formaldehyde with the alkylphenol having alkyl group connected to the ortho position or the para position of benzene, because the alkylphenol•formaldehyde resin is compatible with rubber and reactive, thus making a crosslinking reaction start time comparatively early. The alkyl group of the alkylphenol•formaldehyde resin has 1-10 carbon atoms. Methyl group, ethyl group, propyl group and butyl group are exemplified as the alkyl group. Halides of the alkylphenol•formaldehyde resin can be preferably used.

As the resinous crosslinking agent, it is possible to use modified alkylphenol resin formed by addition condensation of para-tertiary butyl phenol sulfide and aldehydes and alkylphenol•sulfide resin.

It is favorable that the mixing amount of the resinous crosslinking agent is set to favorably not less than two nor more than 20 parts by mass for 100 parts by mass of the crosslinkable rubber or/and thermoplastic elastomer. If the mixing amount of the resinous crosslinking agent is less than two parts by mass, the crosslinkable rubber or/and thermoplastic elastomer is insufficiently crosslinked. Thus the conductive thermoplastic elastomer composition has a low wear resistance. On the other hand, if the mixing amount of the resinous crosslinking agent exceeds 20 parts by mass, there is a possibility that the molding of the conductive thermoplastic elastomer composition has a very high hardness. It is more favorable that the mixing amount of the resinous crosslinking agent is set to not less than five nor more than 15 parts by mass for 100 parts by mass of the crosslinkable rubber or/and thermoplastic elastomer.

A crosslinking activator may be used to accomplish the dynamic crosslinking reaction properly. Metal oxides are used as the crosslinking activator. As the metal oxides, zinc oxide and zinc carbonate are especially preferable. The mixing amount of the crosslinking activator for 100 parts by mass of the crosslinkable rubber or/and thermoplastic elastomer is set to favorably not less than 0.5 nor more than 10 parts by mass and more favorably not less than one nor more than five parts by mass.

The component (B) comprising the ionic-conductive agent is described below.

The component (B) comprising the ionic-conductive agent is contained in the conductive thermoplastic elastomer composition of the present invention at favorably not less than 8% nor more than 45% in a volume fraction. As the lower limit, the component (B) is contained therein at more favorably not less than 10% and most favorably not less than 15% in the volume fraction. As the upper limit, the component (B) is contained therein at more favorably not more than 40% in the volume fraction.

The above-described range is set for the reason described below. If the component (B) is contained therein at less than 8%, it is difficult to decrease the electric resistance value thereof. On the other hand, if the component (B) is contained therein at more than 45%, the moldability and compression set thereof deteriorate and in addition the electric resistance value thereof little decreases. In this case, the producing cost becomes expensive.

The volume fraction means volume % in the resin matrix phase of the conductive thermoplastic elastomer composition. More specifically, except for the rubber and the thermoplastic elastomer that are dynamically crosslinked to form a domain, the volume % in the resin matrix is a ratio when a composition capable of forming the resin matrix is regarded as the whole.

It is preferable that in a mass ratio, 1 to 20 parts by mass of the component (B) comprising the ionic-conductive agent is used for 100 parts by mass, of the conductive thermoplastic elastomer composition of the present invention. It is preferable that 1 to 35 part, by mass of the component (B) is used for 100 parts by mass of the component (A) comprising the base polymer.

As metals composing the metal salt contained in the component (B) comprising the ionic-conductive agent, alkali metals, alkali earth metals, transition metals, and amphoteric metals are listed. Of the above-described metals, the alkali metals such as lithium and sodium are preferable because they are dissociative.

It is possible to use metal salts provided that they are capable of dissociating the above-exemplified metal as cations. Above all, salts having metal cations and anions having a fluoro group and a sulfonyl group can be preferably used. In the salts, because the fluoro group and the sulfonyl group have electron-attractive property, the anions are stabilized to a high extent and show a high dissociation degree. Thereby the conductive thermoplastic elastomer composition is capable of obtaining a very low electric resistance value by the use of a small amount of the metal salt.

As preferable anions having the fluoro group and the sulfonyl group, a bis(fluoroalkylsulfonyl) imide ion, a tris (fluoroalkylsulfonyl) methide ion, and a fluoroalkylsulfonic acid ion are listed. These anions are preferable because they are compatible with the EO-PO copolymer or/and the EO-PO-AGE copolymer serving as the matrix of the component (B).

As the metal salts, it is possible to list $CF_3SO_3Li$, $C_4F_9SO_3Li$, $(CF_3SO_2)_2NLi$, $(C_2F_5SO_2)_2NLi$, $(C_4F_9SO_2)(CF_3SO_2)NLi$, $(FSO_2C_6F_4)(CF_3SO_2)NLi$, $(C_8F_{17}SO_2)(CF_3SO_2)NLi$, $(CF_3CH_2OSO_2)_2NLi$, $(CF_3CF_2CH_2OSO_2)_2NLi$, $(HCF_2CF_2CH_2OSO_2)_2NLi$, $((CF_3)_2CHOSO_2)_2NLi$, $(CF_3SO_2)_3CLi$, $(CF_3CH_2OSO_2)_3CLi$, and $LiPF_6$.

It is preferable that 5 to 30 parts by mass of the metal salt is added to 100 parts by mass of the ionic-conductive agent (B).

If the mixing amount of the metal salt is less than 5 parts by mass, it is impossible to obtain a sufficient conductivity-imparting effect. On the other hand, if the mixing amount of the metal salt is more than 30 parts by mass, the conductive thermoplastic elastomer composition is liable to become hard. Even though the metal salt is added to the ionic-conductive agent (B) in an amount more than a certain level, the conductivity of the conductive thermoplastic elastomer composition little changes. Because the metal salt is expensive, the producing cost becomes high.

Because the EO-PO copolymer or/and the EO-PO-AGE copolymer contain the metal salt, the EO-PO copolymer or/and the EO-PO-AGE copolymer stabilize ions deriving from the metal salt. Thereby it is possible to obtain an outstanding effect of decreasing the electric resistance value of the obtained conductive thermoplastic elastomer composition.

The copolymerization ratio of the ethylene oxide in the EO-PO copolymer or the EO-PO-AGE copolymer is favorably not less than 55 mol % nor more than 95 mol % and more favorably not less than 65 mol % nor more than 95 mol %. Metal cations of the metal salt are stabilized by the ethylene oxide unit and the propylene oxide unit. The ethylene oxide unit has a higher performance than the propylene oxide unit in stabilizing the metal cations. Thus by setting the copolymerization ratio of the ethylene oxide unit higher than that of the propylene oxide unit, a large number of ions can be stabilized. If the copolymerization ratio of the ethylene oxide unit exceeds 95 mol %, the ethylene oxide unit crystallizes.

When the EO-PO-AGE copolymer is used, it is preferable to set the copolymerization ratio of the allyl glycidyl ether to not less than 1 mol % nor mores than 10 mol %. If the copolymerization ratio of the allyl glycidyl ether is less than 1 mol %, bleeding is liable to occur and a photoreceptor is liable to be polluted. On the other hand, if the copolymerization ratio thereof is more than 10 mol %, the tensile strength, the fatigue property, and bending resistance of the conductive thermoplastic elastomer composition are liable to deteriorate.

The number-average molecular weight of the EO-PO copolymer or the EO-PO-AGE copolymer is favorably not less than 10000 and more favorably not less than 30000 to prevent bleeding and blooming from occurring and the photoreceptor from being polluted.

The EO-PO copolymer or/and the EO-PO-AGE copolymer may be dynamically crosslinked in the conductive thermoplastic elastomer composition of the present invention.

It is normal to use a crosslinking agent to dynamically crosslink the EO-PO copolymer or/and the EO-PO-AGE copolymer. Known crosslinking agents such as a resinous crosslinking agent, a peroxide, and the like can be used. It is preferable to use the peroxide.

As the peroxides contained, it is possible to use compounds capable of crosslinking the rubber component. For example, it is possible to list benzoyl peroxide, 1,1-bis(tert-butyl peroxy)-3,3,5-trimethylcyclohexane, 2,5-dimethyl-2,5-di-(benzoyl peroxy)hexane, di(tert-butyl peroxy)di-isopropylbenzene, 1,4-bis[(tert-butyl)peroxy isopropyl]benzene, di(tert-butyl peroxy)benzoate, tert-butyl peroxybenzoate, dicumyl peroxide, tert-butyl cumyl peroxide, 2,5-dimethyl-2,5-di (tert-butyl peroxy)hexane, di-tert-butyl peroxide, and 2,5-dimethyl-2,5-di(tert-butyl peroxy)-3-hexene. These peroxides may be used singly or by mixing two or more of them with each other. It is especially favorable to use the di(tert-butyl peroxy)di-isopropylbenzene.

The mixing amount of the peroxide is set to 0.1 to 5 parts by mass for 100 parts by mass of the EO-PO copolymer or/and the EO-PO-AGE copolymer. If the mixing amount of the peroxide is set to less than 0.1 parts by mass, the EO-PO copolymer or/and the EO-PO-AGE copolymer are insufficiently crosslinked. Thus it is impossible to obtain the effect of the dynamic crosslinking such as the improvement of the wear resistance of the obtained conductive thermoplastic elastomer composition. On the other hand, if the mixing amount of the peroxide exceeds 5 parts by mass, the property thereof deteriorates because molecules are cut off and in addition a defective dispersion occurs. Therefore it is difficult to process the conductive thermoplastic elastomer composition into a molding.

A crosslinking assistant may be used together with the peroxide. The crosslinking assistant crosslinks itself and reacts with molecules of rubber and crosslinks them, thus making the entire elastomer composition polymeric. By co-crosslinking the rubber component with the crosslinking assistant, the crosslinking density increases, and the mechanical properties such as the wear resistance of the obtained conductive thermoplastic elastomer composition can be improved and adjusted.

As the crosslinking assistant, it is possible to list metal salts of methacrylic acid or acrylic acid, methacrylate ester, aromatic vinyl compounds, heterocyclic vinyl compounds, allyl compounds, polyfunctional polymers utilizing the functional group of 1,2-polybutadiene, and dioximes. More specifically, it is possible to list triallyl isocyanurate (TAIC), triallyl cyanurate (TAC), trimethylolpropane trimethacrylate (TMPT), ethylene glycol dimethacrylate (EDMA), p-quinonedioxime, p,p'-dibenzoylquinonedioxime, and N,N'-m-phenylenebismaleimide. Of these crosslinking assistant, the dioximes is favorable, and the N,N'-m-phenylenebismaleimide is more favorable than the other crosslinking assistants.

The mixing amount of the crosslinking assistant can be selected appropriately in relation to the kind of the crosslinking assistant or other components to be used. But the mixing amount of the crosslinking assistant is favorably not less than 0.1 nor more than 20 parts by mass and more favorably not less than 0.1 nor more than 15 parts by mass for 100 parts by mass of the EO-PO copolymer or/and the EO-PO-AGE copolymer.

The component (C) comprising the ethylene-acrylic ester-maleic anhydride copolymer is described below.

By adding the ethylene-acrylic ester-maleic anhydride copolymer to the component (A) comprising the base polymer, the ionic-conductive agent can be finely dispersed therein. Thereby the conductive thermoplastic elastomer composition having an excellent dispersibility is obtained.

The mixing amount of the component (C) comprising the ethylene-acrylic ester-maleic: anhydride copolymer is set to preferably 0.1 to 5 parts by mass for 100 parts by mass of the conductive thermoplastic elastomer composition of the present invention.

The mixing amount of the component (C) is set to preferably 0.1 to 10 parts by mass for 100 parts by mass of the component (A). The mixing amount of the component (C) is set to preferably 1 to 50 parts by mass for 100 parts by mass of the component (B).

The reason the mixing amount of the component (C) is set to the above-described range is as follows: If the mixing amount of the component (C) is less than the lower limit value, the effect of the compatibility is obtained to a low extent. Thus there is a fear that the conductive thermoplastic elastomer composition has deteriorated properties and is defectively molded. On the other hand, if the mixing amount of the component (C) is more than the upper limit value, the component (C) does not greatly influence the effect of the compatibility, and further there is a possibility that the conductive thermoplastic elastomer composition has a low strength and a high hardness.

In the ethylene-acrylic ester-maleic anhydride copolymer, the content of the acrylic ester is set to favorably 0.1 to 30 mass %, more favorably 1 to 20 mass %, and most favorably 3 to 15 mass %. The content of the maleic anhydride is set to 0.05 to 20 mass %, favorably 0.1 to 15 mass %, and more favorably 0.5 to 10 mass %, and most favorably 1 to 10 mass %.

As the acrylic ester of the above-described copolymer, methyl acrylate, ethyl acrylate, propyl acrylate, butyl acrylate, and 2-ethylhexyl acrylate are preferable. Ethylene-methacrylic ester-maleic anhydride terpolymer in which methacrylic ester is used instead of the acrylic ester may be used as the component (C).

It is most favorable to use the ethylene-acrylic ester-maleic anhydride copolymer as the component (C). But it is possible to use one or two kinds of the terpolymers corresponding to the definition described below.

The terpolymer which can be contained in the conductive thermoplastic elastomer composition as the component (C) is composed of an olefin component (c1), acrylic ester or methacrylic ester (c2), and an unsaturated carboxylic unit (c3).

As the olefin component (c1), it is possible to list ethylene hydrocarbons having 2 to 6 carbon atoms such as ethylene, propylene, isobutylene, 1-butene, 1-pentene, and 1-hexene.

As examples of the component (c2) of the acrylic ester or the methacrylic ester, it is possible to list esterified substances produced by the reaction between alcohol and acrylic acid or methacrylic acid such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate. Of these acrylic esters or the methacrylic esters, the methyl acrylate, the methyl methacrylate, the ethyl acrylate, and the ethyl methacrylate are preferable.

The unsaturated carboxylic acid unit (c3) is introduced by unsaturated carboxylic acid or anhydrides thereof. More specifically, it is possible to list acrylic acid, methacrylic acid, maleic acid, maleic anhydride, itaconic acid, itaconic anhydride, fumaric acid, crotonic acid, half ester of unsaturated dicarboxylic acid, and half amide. Above all, the acrylic acid, the methacrylic acid, the maleic acid, and the maleic anhydride are favorable. The maleic anhydride is more favorable than the acrylic acid, the methacrylic acid, and the maleic acid. The mode of the unsaturated carboxylic acid unit is not limited to a specific mode, provided that it is copolymerized with the above-described terpolymer. It is possible to exemplify a random copolymer, a block copolymer, and a graft copolymer.

The content of the acrylic ester or the methacrylic ester (c2) is set to favorably 0.1 to 30 mass %, more favorably 1 to 20 mass %, and most favorably 5 to 15 mass %. The content of the unsaturated carboxylic unit (c3) set to 0.05 to 20 mass %, favorably 0.1 to 15 mass %, more favorably 0.5 to 10 mass %, and most favorably 1 to 10 mass %.

The conductive thermoplastic elastomer composition may contain the component (D) consisting of the polyester thermoplastic elastomer.

The present inventors have found that by using the component (D) consisting of the polyester thermoplastic elastomer for the conductive thermoplastic elastomer composition, it is possible to enhance the flowability of the components without sacrificing the conductivity of the conductive thermoplastic elastomer composition and contribute to an excellent dispersibility of the components of the conductive thermoplastic elastomer composition, because the electric resistance of the polyester thermoplastic elastomer falls in the conductive region and because the polyester thermoplastic elastomer is compatible with the EO-PO copolymer or/and the EO-PO-AGE copolymer and the ethylene-acrylic ester-maleic anhydride copolymer.

As the component (D) consisting of the polyester thermoplastic elastomer, according to properties demanded for the conductive thermoplastic elastomer composition of the present invention, it is possible to use the polyester thermoplastic elastomers having various degrees of hardness, elastic modulus, moldability, and the like. It is possible to exemplify polyester polyether thermoplastic elastomers and polyester polyester thermoplastic elastomers. These polyester thermoplastic elastomers may be used as a mixture.

As the polyester thermoplastic elastomer, a thermoplastic elastomer composed of a high-melting point polyester constituent component and a low-melting point polyester constituent component is preferable. More specifically, in the above-described preferable thermoplastic elastomer, when a polymer consists of the high-melting point polyester constituent component, the polymer has a melting point not less than 150° C. When a polymer consists of the low-melting point polyester constituent component, the polymer has a melting point or a softening point not more than 80° C.

As the polyester thermoplastic elastomers, a copolymer composed of the hard segment consisting of polyester having an aromatic ring and a soft segment consisting of polyether and/or the polyester is preferable.

As constituent components of the hard segment consisting of the polyester having the aromatic ring, it is possible to use aromatic dicarboxylic acids such as terephthalic acid, isophthalic acid, diphenyldicarboxylic acid, 2,6-naphthalenedicarboxylic acid; esters of the aromatic dicarboxylic acids; glycols having 1 to 25 carbon atoms; and ester-forming derivatives of the glycols.

It is preferable to use the terephthalic acid as the acidic component. Although it is preferable to use only the terephthalic acid, it is possible to use other acidic components in combination with the terephthalic acid if necessary. When other acidic components are used in combination with the terephthalic acid, 100 mole % of the entire acidic component contains favorably not less than 70 mole % of the terephthalic acid and more favorably not less than 75 mole %.

As the glycols having 1 to 25 carbon atoms, ethylene glycol, 1,4-butanediol, and the like are listed.

As the constituent component of the hard segment consisting of the polyester having the aromatic ring, polybutylene terephthalate is preferable.

As the soft segment consisting of the polyether, it is possible to list poly(alkylene ether) glycol such as poly(ethylene oxide) glycol and poly(tetramethylene oxide) glycol. The number of carbon atoms in the alkylene portion is not limited to two and four in the exemplified compounds, but is favorably 2 to 20 and more favorably 2 to 10.

It is preferable that the soft segment consisting of the polyether is contained at 15 to 75 mass % of the entire mass of the polyester polyether thermoplastic elastomer.

In the polyether polyester thermoplastic elastomer, the elastic modulus of the molecular chain consisting of the soft segment little changes, i.e., is stable between a low temperature and humidity and a high temperature and humidity. Therefore the conductive thermoplastic elastomer composition of the present invention is dependent on environment to a low extent for its electric resistance value.

It is preferable to use lactones as the soft segment consisting of the polyester. Caprolacton is most favorable of the lactones. In addition, it is possible to use enanlacton or caprylolacton. It is possible to use not less than two kinds of these lactones in combination.

In the polyester polyester thermoplastic elastomer, the copolymerization ratio between the aromatic polyester and the lactones is selected according to a use. The normal copolymerization ratio (mass ratio) of the aromatic polyester to the lactones is 97:3 to 5:95 and favorably 95:5 to 30:70.

The mixing amount of the component (D) is set to favorably 0.5 to 10 parts by mass for 100 parts by mass of the conductive thermoplastic elastomer composition of the present invention. The mixing amount of the component (D) is set to preferably 0.1 to 10 parts by mass for 100 parts by mass of the component (A) and preferably 10 to 200 parts by mass for 100 parts by mass of the component (B).

The reason the mixing amount of the component (D) is set to the above-described range is as follows: If the mixing amount of the component (D) is less than the lower limit value, the effect of the compatibility is obtained to a low extent. Thus there is a fear that the conductive thermoplastic elastomer composition has deteriorated properties and is defectively molded. On the other hand, if the mixing amount of the component (D) is more than the upper limit value, the component (D) does not greatly influence the effect of the compatibility, and further there is a possibility that the conductive thermoplastic elastomer composition has a low strength and a high hardness.

The conductive thermoplastic elastomer composition of the present invention may contain components other than the components (A), (B), (C), and (D) so long as the use thereof is not contradictory to the object of the present invention.

For example, the conductive thermoplastic elastomer composition may contain a softener to allow the conductive thermoplastic elastomer composition to be appropriately flexible and elastic.

As the softener, oil and plasticizer can be used. As the oil, it is possible to use known synthetic oil such as paraffin oil, naphthenic oil, mineral oil of aromatic series, hydrocarbon oligomer, and process oil. As the synthetic oil, it is possible to use oligomer of $\alpha$-olefin, oligomer of butene, and amorphous oligomer of ethylene and $\alpha$-olefin. It is possible to use plasticizers such as phthalates, adipates, sebacates, phosphates, polyethers, and polyesters. More specifically it is possible to list dioctyl phthalate (DOP), dibutyl phthalate (DBP), dioctyl sebacate (DOS), and dioctyl adipate (DOA).

It is preferable that the mixing amount of the softener is set to 10 to 200 parts by mass for 100 parts by mass of the component (A). If the mixing amount of the softener is less than 10 parts by mass, the conductive thermoplastic elastomer composition is liable to have a high hardness. On the other hand, if mixing amount of the softener is more than 200 parts by mass, the softener is liable to bleed.

When the component (A) comprises the thermoplastic elastomer composition in which the crosslinkable rubber or/and the thermoplastic elastomer are dynamically crosslinked and dispersed in the thermoplastic resin or/and the thermoplastic elastomer, the mixing amount of the softener is set to favorably the range of 15 to 600 parts by mass and more favorably the range of 25 to 400 parts by mass for 100 parts by mass of the crosslinkable rubber or/and the thermoplastic elastomer.

If the mixing amount of the softener is less than the above-described lower limit value, it is difficult to obtain the effect of the addition of the softener, namely, the effect of improving the dispersibility of the crosslinkable rubber or/and the thermoplastic elastomer at a dynamic crosslinking time. On the other hand, if the mixing amount of the softener is more than the above-described upper limit value, the softener inhibits crosslinking. Thus the crosslinkable rubber or/and the thermoplastic elastomer cannot be sufficiently dynamically crosslinked and hence the obtained conductive thermoplastic elastomer composition has deteriorated properties.

The above-described mixing amount of the softener includes the amount of extended oil when oil-extended rubber is used.

A filler and other additives may be used to improve the mechanical strength of the conductive thermoplastic elastomer composition.

As the filler, it is possible to use powder of silica, carbon black, clay, talc, calcium carbonate, dibasic phosphite (DLP), basic magnesium carbonate, and alumina.

It is preferable to use not more than 15 mass % of the filler for the entire mass of the conductive thermoplastic elastomer composition of the present invention. The above-described mixing range is set for the reason described below. The filler is effective for improving the tensile strength and tearing strength of the conductive thermoplastic elastomer composition. But if the filler is used in a very large amount, the flexibility thereof deteriorates. Consequently a roller composed of the conductive thermoplastic elastomer composition has a low coefficient of friction.

A foaming agent may be used to impart flexibility to the conductive thermoplastic elastomer composition.

Known foaming agents can be used. It is preferable to use a foaming agent of a micro-capsule type. The use of the foaming agent of the micro-capsule type allows the formation of closed cells and the size of bubble holes and the number thereof to be easily controlled. Therefore the wearability of the conductive thermoplastic elastomer composition little deteriorates. The mixing amount of the foaming agent is set to favorably 0.1 to 10 parts by mass and more favorably 0.5 to 10 parts by mass for 100 parts by mass of the conductive thermoplastic elastomer composition of the present invention.

The conductive thermoplastic elastomer composition of the present invention may contain additives such as an age resistor, an antioxidant, an ultraviolet ray-absorbing agent, a lubricant, a pigment, an antistatic agent, a flame retardant, a neutralizer, a nucleating agent, and an agent for preventing the generation of air-bubbles.

Secondly the present invention provides a method of producing the above-described conductive thermoplastic elastomer composition.

More specifically the present invention provides the method of producing the conductive thermoplastic elastomer composition containing the component (A) comprising the base polymer composed of the thermoplastic elastomer composition in which the crosslinkable rubber or/and the thermoplastic elastomer are dynamically crosslinked and dispersed in the thermoplastic resin or/and the thermoplastic elastomer; the component (B) comprising the ionic-conductive agent containing the EO-PO copolymer or/and the EO-PO-AGE copolymer and the metal salt contained in the EO-PO copolymer or/and the EO-PO-AGE copolymer; and the component (C) comprising the ethylene-acrylic ester-maleic anhydride copolymer.

Before mixing the components (A) through (C) with each other, the crosslinkable rubber or/and the thermoplastic elastomer are dynamically crosslinked in the component (A).

In the method of producing the conductive thermoplastic elastomer composition containing the polyester thermoplastic elastomer in addition to the components (A) through (C), before mixing the components (A) through (D) with each other, the crosslinkable rubber or/and the thermoplastic elastomer are dynamically crosslinked in the component (A).

More specifically, the crosslinkable rubber or/and the thermoplastic elastomer are dynamically crosslinked by the crosslinking agent preferably by the resinous crosslinking agent by using an extruder or a kneader and thereafter dispersed in the thermoplastic resin or/and the thermoplastic elastomer.

Thereafter the obtained thermoplastic elastomer composition (A), the ionic-conductive agent (B), the ethylene-acrylic ester-maleic anhydride copolymer (C), and the polyester thermoplastic elastomer (D) which is used if necessary are kneaded by using the extruder or the kneader. Thereby the conductive thermoplastic elastomer composition of the present invention is obtained.

The ionic-conductive agent (B) has a characteristic that it hardly enters a dynamically crosslinked domain phase, but is selectively mixed in a matrix phase. Thus according to the above-described method, the ionic-conductive agent is selectively disposed in the matrix of the conductive thermoplastic elastomer composition. That is, the ionic-conductive agent (B) can be locally present in the thermoplastic resin or/and the thermoplastic elastomer (A) serving as the matrix of the conductive thermoplastic elastomer composition.

Consequently the ionic-conductive agent contained in the conductive thermoplastic elastomer composition does not adversely affect a crosslinking degree of the rubber. Thus it is possible to suppress an increase in the compression set. Further it is unnecessary to increase the usage of the ionic-conductive agent. Therefore it is possible to prevent an increase in the hardness of the conductive thermoplastic elastomer composition and reduce the material cost.

It is possible to obtain the conductive thermoplastic elastomer composition of the present invention by kneading the crosslinkable rubber or/and the thermoplastic elastomer, the thermoplastic resin or/and the thermoplastic elastomer, the crosslinking agent preferably the resinous crosslinking agent, the ionic-conductive agent (B), the ethylene-acrylic ester-maleic anhydride copolymer (C), and the polyester thermoplastic elastomer (D) which is used if necessary and thereafter dynamically crosslinking the crosslinkable rubber or/and the thermoplastic elastomer simultaneously with the mixing of the components.

The following two methods can be used in dynamically crosslinking the EO-PO copolymer or/and the EO-PO-AGE copolymer contained in the ionic-conductive agent (B).

In the first method, initially the crosslinkable rubber or/and the thermoplastic elastomer are dynamically crosslinked by the crosslinking agent preferably the resinous crosslinking agent and dispersed in the thermoplastic resin or/and the thermoplastic elastomer to form the thermoplastic elastomer composition (A). Thereafter the obtained thermoplastic elastomer composition (A), the ionic-conductive agent (B), the ethylene-acrylic ester-maleic anhydride copolymer (C), the polyester thermoplastic elastomer (D) which is used if necessary, the crosslinking agent preferably peroxide are kneaded. Thereby simultaneously with the mixing of the components (A) through (C) or the components (A) through (D), the EO-PO copolymer or/and the EO-PO-AGE copolymer contained in the ionic-conductive agent (B) are dynamically crosslinked by the crosslinking agent preferably peroxide. In this manner, the conductive thermoplastic elastomer composition of the present invention is obtained.

In the second method, initially the crosslinkable rubber or/and the thermoplastic elastomer are dynamically crosslinked by the crosslinking agent preferably the resinous crosslinking agent and dispersed in the thermoplastic resin or/and the thermoplastic elastomer to form the thermoplastic elastomer composition (A). The EO-PO copolymer or/and the EO-PO-AGE copolymer contained in the ionic-conductive agent (B) are crosslinked by the crosslinking agent preferably peroxide. Thereafter the thermoplastic elastomer composition (A) obtained in the above-described step, the ionic-conductive agent (B) obtained in the above-described step, the ethylene-acrylic ester-maleic anhydride copolymer (C), and the polyester thermoplastic elastomer (D) which is used if necessary are kneaded to obtain the conductive thermoplastic elastomer composition of the present invention.

In the present invention, the first method is more favorable than the second method because fewer steps are necessary for carrying the first method.

It is preferable that the heating temperature at which the crosslinkable rubber or/and the thermoplastic elastomer are dynamically crosslinked is set to 160 to 250° C. and that the heating period of time is 1 to 20 minutes. It is preferable that the heating temperature at which the components (A) through (C) or the components (A) through (D) are mixed with one another is set to 160 to 250° C. and that the heating period of time is 1 to 20 minutes. A twin-screw extruder, a Banbury mixer, a kneader or the like is used for the dynamic crosslinking and the kneading.

The crosslinkable rubber or/and the thermoplastic elastomer may be dynamically crosslinked in the presence of halogen, namely, chlorine, bromine, fluorine or iodine. To allow the halogen to be present at the dynamic crosslinking time, it is favorable that the elastomer composition contains a halogenated resinous crosslinking agent or a halogen donor. As the halogen donor, tin chloride such as stannic chloride, ferric oxide, and cupric chloride are listed. The halogen donor can be used singly or in combination of two or more thereof.

It is preferable to pelletize the conductive thermoplastic elastomer composition obtained by carrying out the above-described method to facilitate processing to be performed at subsequent steps. Thereby it is possible to obtain a preferable moldability.

The present invention further provides a molding to be obtained by molding the conductive thermoplastic elastomer composition of the present invention.

The molding of the present invention can be used for various purposes. It is possible to provide the molding having various configurations according to uses. Above all, it is preferable to use the molding as conductive members in an image-forming apparatus such as a copying machine, a printer, a facsimile, an ATM, and the like. As conductive members, it is possible to list a roller-shaped conductive roller, an endless belt-shaped conductive belt, a sheet-shaped pad, and the like.

The conductive roller has a cylindrical conductive layer made of the conductive thermoplastic elastomer composition of the present invention and a columnar shaft. The construction of the conductive roller having one conductive layer on the periphery of the shaft is simple and preferable from the viewpoint of an industrial production. But other than the conductive layer, it is preferable to form a two-layer or three-layer construction to adjust; the electric resistance value of the conductive roller, protect the surface thereof, and appropriately set the kind of each layer, a layering order, the thickness of the layers according to performance demanded for the conductive roller. The shaft may be made of metal such as aluminum, aluminum alloy, SUS, metal, iron or ceramic.

The conductive roller is used inside the image-forming apparatus. More specifically, the conductive roller is used as a charging roller for uniformly charging an photoreceptor, a developing roller for attaching toner to a photoreceptor, a transfer roller for transferring a toner image to paper or an intermediate transfer belt from the photoreceptor, a toner supply roller for transporting the toner, a driving roller for driving a transfer belt from the inner side thereof, a paper-feeding roller (more specifically, paper supply roller, transport roller or paper discharge roller constructing paper supply mechanism) contributing to the transport of the paper, and a cleaning roller for removing residual toner.

The conductive roller can be produced by using a normal method. For example, the pelletized conductive thermoplastic elastomer composition of the present invention is tubularly injection-molded by an injection molder. After the surface of a molding is polished, the molding is cut in a desired dimension, the shaft is inserted thereinto and bonded thereto. As desired, the surface thereof is polished. Thereby the conductive roller can be produced. It is also possible to produce the conductive roller by tubularly extruding the conductive thermoplastic elastomer composition by a single-screw extruder for resin instead of the injection molder, polishing the molding as desired, cutting it to a desired dimension, inserting the shaft thereinto, and bonding it thereto.

It is preferable that the conductive belt has only one conductive layer made of the conductive thermoplastic elastomer composition of the present invention from the viewpoint of an industrial production. But other than the conductive layer, it is preferable to form a two-layer or three-layer construction by forming layers on the inner and outer surfaces of the conductive belt to adjust the electric resistance value of the conductive belt and protect the surface thereof and appropriately set the kind of each layer, a layering order, the thickness of the layers according to performance demanded for the conductive belt.

The conductive belt is used for the image-forming apparatus. More specifically, the conductive belt is used as a transfer belt, an intermediate transfer belt, a fixing belt, a belt for a base of a photoreceptor.

The conductive belt is produced by a normal method. For example, it is possible to produce the conductive belt by extruding the pelletized conductive thermoplastic elastomer composition of the present invention into the shape of a belt by a resin molder and thereafter air-cooling the belt-shaped molding.

It is possible to form an oxide film by irradiating the surface of the conductive member of the present invention with ultraviolet rays. The oxide film serving as a dielectric layer decreases the loss tangent of the conductive member. The oxide film serving as a low-friction layer provides a favorable toner separation effect.

A coating layer may be formed on the peripheral surface of the conductive member. For example, the coating layer can be formed by selecting a known coating material which contains a main polymer of the coating material selected from the group consisting of urethane, acrylic resin and rubber latex, and fluororesin dispersed in the main polymer. Coating treatment is performed by using a known method such as electrostatic deposition, spray coating, dipping or brush paint. It is preferable that the thickness of the coating layer is 1 to 20 µm. By coating the surface the conductive member with the coating material, it is possible to obtain the effect of easily scraping toner which remains at a transfer time, changing the attaching and removing properties of toner, controlling the surface energy, preventing attaching of paper powder and sticking of the toner, and decreasing the coefficient of friction of the conductive member.

The properties of the conductive member of the present invention can be adjusted according to uses. For example, the electric resistance value of the conductive roller is set to favorably the range of $10^{4.0}\Omega$ to $10^{9.0}\Omega$ and more favorably in the range of $10^6\Omega$ to $10^8\Omega$, when 1000V is applied thereto.

The effect of the present invention is described below. The conductive thermoplastic elastomer composition of the present invention has rubber-like durability, elasticity, and flexibility and resin-like moldability and a semiconductive electric resistance value.

The components of the conductive thermoplastic elastomer composition of the present invention have excellent dispersibility. Consequently the components do not separate and the conductive thermoplastic elastomer composition can be prevented from being defectively molded. For example, marks of stripes are not generated on the surface of the conductive roller composed of the conductive thermoplastic elastomer composition. Therefore it is possible to increase the yield in the producing process and prevent the property of the conductive thermoplastic elastomer composition from deteriorating at a high temperature and humidity.

The EO-PO copolymer or/and the EO-PO-AGE copolymer contained in the conductive thermoplastic elastomer composition of the present invention stabilize ions deriving from the metal salt. Thereby the conductive thermoplastic elastomer composition is allowed to have a low electric resistance value without increasing the amount of the expensive metal salt. The use of the EO-PO copolymer or/and the EO-PO-AGE copolymer is advantageous in decreasing the producing cost of the conductive thermoplastic elastomer composition.

Because the conductive thermoplastic elastomer composition of the present invention is thermoplastic, it can be recycled.

Further by containing the polyester thermoplastic elastomer in the conductive thermoplastic elastomer composition of the present invention, the conductive thermoplastic elastomer composition has a high flowability and thus can be easily processed into a molding. The polyester thermoplastic elastomer contributes to the realization of the excellent dispersibility of the components of the conductive thermoplastic elastomer composition. Because the electric resistance of the polyester thermoplastic elastomer falls in the conductive region, the conductivity of the conductive thermoplastic elastomer composition is not sacrificed.

It is possible to preferably use the conductive roller produced by molding the conducive thermoplastic elastomer composition of the present invention having the above-described characteristics as conductive members of an image-forming apparatus such as a printer, an electrostatic copying machine, a facsimile, and an ATM, and the like. The conductive roller allows the image-forming apparatus to form a high-quality image for a long time.

DETAILED DESCRIPTION OF THE PREFERRED EMBODIMENTS

The first embodiment of the present invention will be described below with reference to the drawings.

A conductive thermoplastic elastomer composition of the first embodiment contains a component (A) consisting of a base polymer composed of a thermoplastic elastomer composition containing a mixture of an olefin resin and a styrene thermoplastic elastomer, EPDM or/and acrylonitrile-butadiene rubber (hereinafter referred to as NBR) dynamically crosslinked and dispersed in the mixture of the olefin resin and the styrene thermoplastic elastomer; a component (B) consisting of an ionic-conductive agent containing an EO-PO-AGE copolymer and a metal salt, composed of metal cations and anions having a fluoro group and a sulfonyl group, which is contained in the EO-PO-AGE copolymer; and a component (C) consisting of an ethylene-acrylic ester-maleic anhydride copolymer.

The component (B) consisting of the ionic-conductive agent containing the EO-PO-AGE copolymer may be dynamically crosslinked.

In the component (A) consisting of the base polymer of the first embodiment, polypropylene is used as the olefin resin. A styrene-ethylene-ethylene/propylene-styrene copolymer (SEEPS) is used as the styrene thermoplastic elastomer. In the mixing ratio between the olefin resin and the styrene thermoplastic elastomer, 30 to 50 parts by mass of the olefin resin is mixed with 100 parts by mass of the styrene thermoplastic elastomer.

100 to 400 parts by mass and preferably 200 to 400 parts by mass of the crosslinkable EPDM or/and NBR is mixed with 100 parts by mass of the mixture of the styrene thermoplastic elastomer and the olefin resin.

It is favorable to use low nitrile NBR having a nitrile content at less than 25%.

The EPDM or/and the NBR are dynamically crosslinked by a resinous crosslinking agent. As the resinous crosslinking agent, halogenated alkylphenol is especially preferable.

The mixing amount of the resinous crosslinking agent is set to 5 to 15 parts by mass and preferably 10 to 15 parts by mass for 100 parts by mass of the EPDM or/and the NBR.

It is preferable that the conductive thermoplastic elastomer composition of the present invention contains 20 to 40% of the component (B) consisting of the ionic-conductive agent in a volume fraction.

It is preferable that in a mass ratio, 2 to 15 parts by mass of the ionic-conductive agent (B) is contained in 100 parts by mass of the conductive thermoplastic elastomer composition of the present invention. It is preferable that the mixing amount of the ionic-conductive agent (B) is 3 to 25 parts by mass for 100 parts by mass of the base polymer (A).

As the metal salt, fluoroalkylsulfonic lithium is used. The mixing amount of the metal salt is set to 10 to 25 parts by mass for 100 parts by mass of the entire component (B) consisting of the ionic-conductive agent.

In the present invention, the EO-PO-AGE copolymer having a content ratio among ethylene oxide, propylene oxide, allyl glycidyl ether at 80 to 95 mol %, 1 to 10 mol %, and 1 to 10 mol % is used. It is especially preferable that the number-average molecular weight of the EO-PO-AGE copolymer is not less than 50000.

The EO-PO-AGE copolymer may be dynamically crosslinked by a peroxide.

It is preferable to use di(tert-butyl peroxy)diisopropyl benzene as the peroxide. It is preferable that the mixing amount of the peroxide is set to 0.5 to 3 parts by mass for 100 parts by mass of the EO-PO-AGE copolymer.

A crosslinking assistant may be used together with the peroxide. As the crosslinking assistant, dioximes are favorable and N,N'-m-phenylenebismaleimide is more favorable. The mixing amount of the crosslinking assistant is set to 0.1 to 5 parts by mass and favorably 0.2 to 2 parts by mass for 100 parts by mass of the EO-PO-AGE copolymer.

In the component (C) consisting of the ethylene-acrylic ester-maleic anhydride copolymer, methyl acrylate or ethyl acrylate is used as the acrylic ester. The ethyl acrylate is more favorable than the methyl acrylate.

As the mixing ratio of the monomers, the acrylic ester and the maleic anhydride composing the component (C) are set to 3 to 10 mass % and 1 to 5 mass % respectively.

In the copolymer consisting of the component (C), a melt flow rate is set to 0.5 to 100 g/10 minute and preferably 1 to 50 g/10 minutes.

The mixing amount of the component (C) consisting of the ethylene-acrylic ester-maleic anhydride copolymer is set to 0.1 to 3 parts by mass for 100 parts by mass of the conductive thermoplastic elastomer composition of the present invention.

The mixing amount of the ethylene-acrylic ester-maleic anhydride copolymer is set to 3 to 30 parts by mass for 100 parts by mass of the component (B) consisting of ionic-conductive agent and 0.5 to 5 parts by mass for 100 parts by mass of the component (A) consisting of the base polymer.

In addition to the components (A) through (C), the conductive thermoplastic elastomer composition of the first embodiment contains a softener, calcium carbonate, carbon black, and a foaming agent if necessary.

Paraffin oil is favorable as the softener. Paraffin process oil is especially favorable. It is preferable that the mixing amount of the softener is set to the range of 50 to 200 parts by mass for 100 parts by mass of the component (A). It is also preferable that 50 to 250 parts by mass of the softener is used for 100 parts by mass of the EPDM or/and the NBR contained in the component (A).

It is preferable that the mixing amount of the calcium carbonate is set to the range of 5 to 10 parts by mass for 100 parts by mass of the conductive thermoplastic elastomer composition of the present invention.

It is preferable that the mixing amount of the carbon black is set to the range of 1 to 10 parts by mass for 100 parts by mass of the conductive thermoplastic elastomer composition of the present invention.

The foaming agent of the micro-capsule type is preferable. It is preferable that the mixing amount of the foaming agent is set to the range of 0.5 to 5 parts by mass for 100 parts by mass of the conductive thermoplastic elastomer composition of the present invention.

The conductive thermoplastic elastomer composition of the first embodiment is produced by the following method:

Initially the EPDM or/and the NBR are pelletized. The pelletized EPDM or/and NBR, the styrene thermoplastic elastomer, the olefin resin, the crosslinking agent, and the softener are kneaded at 200° C. to form a pellet of the thermoplastic elastomer composition as the component (A) consisting of the base polymer.

The obtained pellet of the component (A) consisting of the thermoplastic elastomer composition, the component (B) consisting of the ionic-conductive agent, the component (C) consisting of the ethylene-acrylic ester-maleic anhydride copolymer, the calcium carbonate, the carbon black, and the foaming agent used if necessary are kneaded at 200° C. to obtain a pellet of the conductive thermoplastic elastomer composition of the present invention.

When the EO-PO-AGE copolymer contained in the component (B) consisting of the ionic-conductive agent is dynamically crosslinked by the peroxide, the peroxide and the crosslinking assistant are kneaded together with the component (B) consisting of the ionic-conductive agent.

A conductive roller of the first embodiment is obtained by molding the conductive thermoplastic elastomer composition of the present invention.

Figure 1:
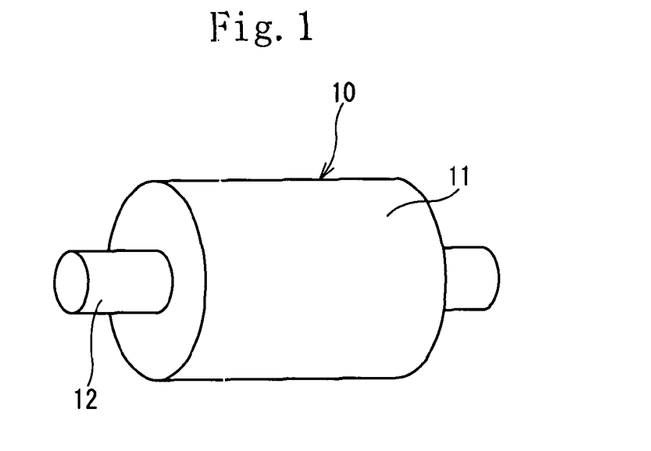
FIG. 1 is a schematic view showing a conductive roller of the present invention.

A conductive roller 10 of the first embodiment is shown in FIG. 1.

The conductive roller 10 is composed of a cylindrical roller part 11 made of the conductive thermoplastic elastomer composition and a columnar metal shaft 12.

The conductive roller 10 is produced by tubularly extruding the pelletized conductive thermoplastic elastomer composition at 180 to 230° C. by using a single-screw extruder and thereafter inserting the metal shaft 12 into a hollow portion of the roller part 11 by press fit or bonding the shaft 12 to the roller part 11 with an adhesive agent. It is possible to produce an approximately D-shaped rubber roller by inserting an approximately D-shaped shaft into the hollow portion of the cylindrically shaped roller part by press fit.

A coating layer (not shown) may be formed on the surface of the conductive roller 10.

The electric resistance value of the conductive roller 10 produced by the above-described method is set to favorably the range of $10^4 \Omega$ to $10^9 \Omega$ and more favorably the range of $10^6 \Omega$ to $10^8 \Omega$ when 1000V is applied thereto.

The second embodiment is described below.

The second embodiment is different from the first embodiment in that the conductive thermoplastic elastomer composition of the second embodiment contains the polyester thermoplastic elastomer in addition to the components (A) through (C) of the conductive thermoplastic elastomer composition of the first embodiment.

The conductive thermoplastic elastomer composition of the second embodiment contains the component (A) consisting of the base polymer composed of the thermoplastic elastomer composition containing the mixture of the olefin resin and the styrene thermoplastic elastomer, the EPDM or/and the NBR dynamically crosslinked and dispersed in the mixture of the olefin resin and the styrene thermoplastic elastomer; the component (B) consisting of the ionic-conductive agent containing the EO-PO-AGE copolymer and the metal salt, composed of the metal cations and the anions having the fluoro group and the sulfonyl group, which is contained in the EO-PO-AGE copolymer; the component (C) consisting of the ethylene-acrylic ester-maleic anhydride copolymer; and the polyester thermoplastic elastomer.

As the component (D) consisting of the polyester thermoplastic elastomer, a copolymer composed of a hard segment consisting of polybutylene terephthalate and a soft segment consisting of polyether is used.

The mixing amount of the component (D) consisting of the polyester thermoplastic elastomer is set to 1 to 10 parts by mass for 100 parts by mass of the conductive thermoplastic elastomer composition of the present invention, 1 to 10 parts by mass for 100 parts by mass of the component (A), and 30 to 120 parts by mass for 100 parts by mass of the component (B).

The mixing amount of the component (C) is set to 10 to 40 parts by mass for 100 parts by mass of the component (D)

In the second embodiment, the pellet of the component (A) obtained by carrying out a method similar to that of the first embodiment, the component (B), the component (C), the component (D), the calcium carbonate, the carbon black, and the foaming agent which is used if necessary were kneaded at 200° C. to obtain the pellet of the conductive thermoplastic elastomer composition.

The other constructions and effects of the second embodiment are similar to those of the first embodiment. Thus the description thereof is omitted herein.

Examples of a paper-feeding roller of the present invention and comparison examples are described below.

Compositions in which components and mixing ratio thereof are shown in tables 1 through 6 were tubularly extruded to obtain moldings. A shaft was inserted into each molding to prepare conductive rollers. Examinations were conducted on the obtained conductive rollers.

Except that components of the compositions of the examples and the comparison examples were different, the conductive rollers of the examples 1 through 9 and those of the comparison examples 1 through 6 were produced in a method similar to that of the first embodiment, and the conductive rollers of the examples 10 through 25 and those of the comparison examples 7 through 16 were produced in a method similar to that of the second embodiment.

TABLE 1

| Component | | | Example 1 | Example 2 | Example 3 | Example 4 |
|---|---|---|---|---|---|---|
| (A) | | EPDM | 100 | 100 | 50 | |
| | | NBR | | | 50 | 100 |
| | | SEEPS | 24.69 | 24.69 | 24.69 | 24.69 |
| | | PP | 10 | 10 | 10 | 10 |
| | | Crosslinking agent | 12 | 12 | 12 | 12 |
| | | Softener | 174 | 174 | 174 | 174 |
| | | Calcium carbonate | 30 | 30 | 30 | 30 |
| | | Carbon black | 10 | 10 | 10 | 10 |
| (C) | | Compatibilizing agent | 1 | 6 | 6 | 6 |
| (B) | | Conductive agent 1 | 20 | 20 | 20 | 20 |
| | | Conductive agent 2 | | | | |
| | | Conductive agent 3 | | | | |
| | | Peroxide | | | | |
| | | Crosslinking assistant | | | | |
| | | Foaming agent | | | | |
| | | Coating on surface of roller | | | | |
| | | State of molding | Good | Good | Good | Good |
| | | Electric resistance value (Ω) of roller | $3 \times 10^8$ | $3 \times 10^8$ | $2 \times 10^8$ | $1 \times 10^8$ |
| | | Stability at high temperature and humidity | Unchanged | Unchanged (Became stable in 14 days) | Unchanged | Unchanged |
| Printing test | | Transfer roller | Good | Good | Good | Good |
| | | Charging roller | — | — | — | — |

| Component | | | Example 5 | Example 6 | Example 7 | Example 8 | Example 9 |
|---|---|---|---|---|---|---|---|
| (A) | | EPDM | 100 | 100 | 100 | 100 | 100 |
| | | NBR | | | | | |
| | | SEEPS | 24.69 | 24.69 | 24.69 | 24.69 | 24.69 |
| | | PP | 10 | 10 | 10 | 10 | 10 |
| | | Crosslinking agent | 12 | 12 | 12 | 12 | 12 |
| | | Softener | 174 | 174 | 174 | 174 | 174 |
| | | Calcium carbonate | 30 | 30 | 30 | 30 | 30 |
| | | Carbon black | 10 | 10 | 10 | 10 | 10 |
| (C) | | Compatibilizing agent | 6 | 6 | 6 | 6 | 6 |
| (B) | | Conductive agent 1 | 60 | 20 | 20 | 60 | 20 |
| | | Conductive agent 2 | | | | | |
| | | Conductive agent 3 | | | | | |
| | | Peroxide | | | | | 0.4 |
| | | Crosslinking assistant | | | | | 0.24 |
| | | Foaming agent | | 11.6 | 11.6 | | |
| | | Coating on surface of roller | | | Formed | Formed | |
| | | State of molding | Good | Good | Good | Good | Good |
| | | Electric resistance value (Ω) of roller | $1 \times 10^6$ | $3 \times 10^7$ | $8 \times 10^7$ | $3 \times 10^6$ | $5 \times 10^8$ |
| | | Stability at high temperature and humidity | Unchanged | Unchanged | Unchanged | Unchanged | Unchanged |
| Printing test | | Transfer roller | — | Good | Good | Good | Good |
| | | Charging roller | Good | — | — | Good | — |

TABLE 2

| Component | | | Example 10 | Example 11 | Example 12 | Example 13 |
|---|---|---|---|---|---|---|
| (A) | | EPDM | 100 | 50 | | 100 |
| | | NBR | | 50 | 100 | |
| | | SEEPS | 24.69 | 24.69 | 24.69 | 24.69 |
| | | PP | 10 | 10 | 10 | 10 |
| | | Crosslinking agent | 12 | 12 | 12 | 12 |
| | | Softener | 174 | 174 | 174 | 174 |
| | | Calcium carbonate | 30 | 30 | 30 | 30 |
| | | Carbon black | 10 | 10 | 10 | 10 |
| (C) | | Compatibilizing agent | 6 | 6 | 6 | 6 |
| (B) | | Conductive agent 1 | 20 | 20 | 20 | 60 |
| | | Conductive agent 2 | | | | |

TABLE 2-continued

|   | Component | | | | |
|---|---|---|---|---|---|
| | Conductive agent 3 | | | | |
| | Conductive agent 4(metal salt not contained) | | | | |
| (D) | TPEE | 20 | 20 | 20 | 20 |
| | Foaming agent | | | | |
| | Coating on surface of roller | | | | |
| | State of molding | Good | Good | Good | Good |
| | Electric resistance value (Ω) of roller | $3 \times 10^8$ | $2 \times 10^8$ | $1 \times 10^8$ | $1 \times 10^6$ |
| | Stability at high temperature and humidity | Unchanged (Became stable in 3 days) | Unchanged (Became stable in 3 days) | Unchanged (Became stable in 3 days) | Unchanged (Became stable in 3 days) |
| Printing test | Transfer roller | Good | Good | Good | — |
| | Charging roller | — | — | — | Good |

| Component | | Example 14 | Example 15 | Example 16 | Example 17 |
|---|---|---|---|---|---|
| (A) | EPDM | 100 | 100 | 100 | 100 |
| | NBR | | | | |
| | SEEPS | 24.69 | 24.69 | 24.69 | 24.69 |
| | PP | 10 | 10 | 10 | 10 |
| | Crosslinking agent | 12 | 12 | 12 | 12 |
| | Softener | 174 | 174 | 174 | 174 |
| | Calcium carbonate | 30 | 30 | 30 | 30 |
| | Carbon black | 10 | 10 | 10 | 10 |
| (C) | Compatibilizing agent | 6 | 6 | 6 | 6 |
| (B) | Conductive agent 1 | 60 | 20 | 20 | 60 |
| | Conductive agent 2 | | | | |
| | Conductive agent 3 | | | | |
| | Conductive agent 4(metal salt not contained) | | | | |
| (D) | TPEE | 50 | 20 | 20 | 50 |
| | Foaming agent | | 12.2 | 12.2 | |
| | Coating on surface of roller | | | Formed | Formed |
| | State of molding | Good | Good | Good | Good |
| | Electric resistance value (Ω) of roller | $1 \times 10^6$ | $3 \times 10^7$ | $8 \times 10^7$ | $3 \times 10^6$ |
| | Stability at high temperature and humidity | Unchanged (Became stable in 3 days) | Unchanged (Became stable in 3 days) | Unchanged (Became stable in 3 days) | Unchanged (Became stable in 3 days) |
| Printing test | Transfer roller | — | Good | Good | Good |
| | Charging roller | Good | — | — | Good |

TABLE 3

| Component | | Example 18 | Example 19 | Example 20 | Example 21 |
|---|---|---|---|---|---|
| (A) | EPDM | 100 | 50 | | 100 |
| | NBR | | 50 | 100 | |
| | SEEPS | 24.69 | 24.69 | 24.69 | 24.69 |
| | PP | 10 | 10 | 10 | 10 |
| | Crosslinking agent | 12 | 12 | 12 | 12 |
| | Softener | 174 | 174 | 174 | 174 |
| | Calcium carbonate | 30 | 30 | 30 | 30 |
| | Carbon black | 10 | 10 | 10 | 10 |
| (C) | Compatibilizing agent | 6 | 6 | 6 | 6 |
| (B) | Conductive agent 1 | 20 | 20 | 20 | 60 |
| | Conductive agent 2 | | | | |
| | Conductive agent 3 | | | | |
| | Conductive agent 4(metal salt not contained) | | | | |
| | Peroxide | 0.4 | 0.4 | 0.4 | 0.4 |
| | Crosslinking assistant | 0.24 | 0.24 | 0.24 | 0.24 |
| (D) | TPEE | 20 | 20 | 20 | 20 |
| | Foaming agent | | | | |
| | Coating on surface of roller | | | | |
| | State of molding | Good | Good | Good | Good |
| | Electric resistance value (Ω) of roller | $5 \times 10^8$ | $4 \times 10^8$ | $3 \times 10^8$ | $3 \times 10^6$ |
| | Stability at high temperature and humidity | Unchanged (Became stable in 1 days) | Unchanged (Became stable in 1 days) | Unchanged (Became stable in 1 days) | Unchanged (Became stable in 1 days) |
| Printing test | Transfer roller | Good | Good | Good | — |
| | Charging roller | — | — | — | Good |

TABLE 3-continued

| Component | | Example 22 | Example 23 | Example 24 | Example 25 |
|---|---|---|---|---|---|
| (A) | EPDM | 100 | 100 | 100 | 100 |
| | NBR | | | | |
| | SEEPS | 24.69 | 24.69 | 24.69 | 24.69 |
| | PP | 10 | 10 | 10 | 10 |
| | Crosslinking agent | 12 | 12 | 12 | 12 |
| | Softener | 174 | 174 | 174 | 174 |
| | Calcium carbonate | 30 | 30 | 30 | 30 |
| | Carbon black | 10 | 10 | 10 | 10 |
| (C) | Compatibilizing agent | 6 | 6 | 6 | 6 |
| (B) | Conductive agent 1 | 60 | 20 | 20 | 60 |
| | Conductive agent 2 | | | | |
| | Conductive agent 3 | | | | |
| | Conductive agent 4(metal salt not contained) | | | | |
| | Peroxide | 0.4 | 0.4 | 0.4 | 0.4 |
| | Crosslinking assistant | 0.24 | 0.24 | 0.24 | 0.24 |
| (D) | TPEE | 50 | 20 | 20 | 50 |
| | Foaming agent | | 12.22 | 12.22 | |
| | Coating on surface of roller | | | Formed | Formed |
| | State of molding | Good | Good | Good | Good |
| | Electric resistance value (Ω) of roller | $3 \times 10^6$ | $5 \times 10^7$ | $9 \times 10^7$ | $5 \times 10^6$ |
| | Stability at high temperature and humidity | Unchanged (Became stable in 1 days) | Unchanged (Became stable in 1 days) | Unchanged (Became stable in 1 days) | Unchanged (Became stable in 1 days) |
| Printing test | Transfer roller | — | Good | Good | Good |
| | Charging roller | Good | — | — | Good |

TABLE 4

| Component | | Comparison Example 1 | Comparison Example 2 | Comparison Example 3 |
|---|---|---|---|---|
| (A) | EPDM | 100 | 100 | 100 |
| | NBR | | | |
| | SEEPS | 24.69 | 24.69 | 24.69 |
| | PP | 10 | 10 | 10 |
| | Crosslinking agent | 12 | 12 | 12 |
| | Softener | 174 | 174 | 174 |
| | Calcium carbonate | 30 | 30 | 30 |
| | Carbon black | 10 | 10 | 10 |
| (C) | Compatibilizing agent | | | 6 |
| (B) | Conductive agent 1 | 20 | | |
| | Conductive agent 2 | | 15.75 | 15.75 |
| | Conductive agent 3 | | | |
| | Peroxide | | | |
| | Crosslinking assistant | | | |
| | Foaming agent | | | |
| | Coating on surface of roller | | | |
| | State of molding | Bad | Good | Good |
| | Electric resistance value (Ω) of roller | — | $1 \times 10^8$ | $1 \times 10^8$ |
| | Stability at high temperature and humidity | — | Gradually decreased | Gradually decreased |
| Printing test | Transfer roller | — | Gradually thicker | Gradually thicker |
| | Charging roller | — | — | — |

| Component | | Comparison Example 4 | Comparison Example 5 | Comparison Example 6 |
|---|---|---|---|---|
| (A) | EPDM | 100 | 100 | 100 |
| | NBR | | | |
| | SEEPS | 24.69 | 24.69 | 24.69 |
| | PP | 10 | 10 | 10 |
| | Crosslinking agent | 12 | 12 | 12 |
| | Softener | 174 | 174 | 174 |
| | Calcium carbonate | 30 | 30 | 30 |
| | Carbon black | 10 | 10 | 10 |
| (C) | Compatibilizing agent | | 6 | |
| (B) | Conductive agent 1 | | | 20 |
| | Conductive agent 2 | | | |
| | Conductive agent 3 | 25 | 25 | |
| | Peroxide | | | 0.4 |
| | Crosslinking assistant | | | 0.24 |
| | Foaming agent | | | |
| | Coating on surface of roller | | | |

TABLE 4-continued

|  | | | | |
|---|---|---|---|---|
| | State of molding | Bad | Good | Bad |
| | Electric resistance value (Ω) of roller | — | $1 \times 10^8$ | — |
| | Stability at high temperature and humidity | — | Gradually decreased | — |
| Printing | Transfer roller | — | Gradually thicker | — |
| test | Charging roller | — | — | — |

TABLE 5

| Component | | Comparison Example 7 | Comparison Example 8 | Comparison Example 9 |
|---|---|---|---|---|
| (A) | EPDM | 100 | 100 | 100 |
| | NBR | | | |
| | SEEPS | 24.69 | 24.69 | 24.69 |
| | PP | 10 | 10 | 10 |
| | Crosslinking agent | 12 | 12 | 12 |
| | Softener | 174 | 174 | 174 |
| | Calcium carbonate | 30 | 30 | 30 |
| | Carbon black | 10 | 10 | 10 |
| (C) | Compatibilizing agent | | | 6 |
| (B) | Conductive agent 1 | 20 | | |
| | Conductive agent 2 | | 15.75 | 15.75 |
| | Conductive agent 3 | | | |
| | Conductive agent 4(metal salt not contained) | | | |
| (D) | TPEE | 20 | 20 | 20 |
| | Foaming agent | | | |
| | Coating on surface of roller | | | |
| | State of molding | Bad | Good | Good |
| | Electric resistance value (Ω) of roller | — | $1 \times 10^8$ | $1 \times 10^8$ |
| | Stability at high temperature and humidity | — | Gradually decreased | Gradually decreased |
| Printing | Transfer roller | — | Gradually thicker | Gradually thicker |
| test | Charging roller | — | — | — |

| Component | | Comparison Example 10 | Comparison Example 11 |
|---|---|---|---|
| (A) | EPDM | 100 | 100 |
| | NBR | | |
| | SEEPS | 24.69 | 24.69 |
| | PP | 10 | 10 |
| | Crosslinking agent | 12 | 12 |
| | Softener | 174 | 174 |
| | Calcium carbonate | 30 | 30 |
| | Carbon black | 10 | 10 |
| (C) | Compatibilizing agent | | 6 |
| (B) | Conductive agent 1 | | |
| | Conductive agent 2 | | |
| | Conductive agent 3 | 25 | 25 |
| | Conductive agent 4(metal salt not contained) | | |
| (D) | TPEE | 20 | 20 |
| | Foaming agent | | |
| | Coating on surface of roller | | |
| | State of molding | Bad | Good |
| | Electric resistance value (Ω) of roller | — | $1 \times 10^8$ |
| | Stability at high temperature and humidity | — | Gradually decreased |
| Printing | Transfer roller | — | Gradually thicker |
| test | Charging roller | — | — |

TABLE 6

| Component | | Comparison Example 12 | Comparison Example 13 | Comparison Example 14 |
|---|---|---|---|---|
| (A) | EPDM | 100 | 100 | 100 |
| | NBR | | | |
| | SEEPS | 24.69 | 24.69 | 24.69 |
| | PP | 10 | 10 | 10 |
| | Crosslinking agent | 12 | 12 | 12 |
| | Softener | 174 | 174 | 174 |
| | Calcium carbonate | 30 | 30 | 30 |
| | Carbon black | 10 | 10 | 10 |
| (C) | Compatibilizing agent | | | 6 |

TABLE 6-continued

| | | | | |
|---|---|---|---|---|
| (B) | Conductive agent 1 | 20 | | |
| | Conductive agent 2 | | 15.75 | 15.75 |
| | Conductive agent 3 | | | |
| | Peroxide | 0.4 | 0.4 | 0.4 |
| | Crosslinking agent | 0.24 | 0.24 | 0.24 |
| | TPEE | 20 | 20 | 20 |
| (D) | Foaming agent | | | |
| | Coating on surface of roller | | | |
| | State of molding | Bad | Good | Good |
| | Electric resistance value (Ω) of roller | — | $3 \times 10^8$ | $3 \times 10^8$ |
| | Stability at high temperature and humidity | — | Gradually decreased | Gradually decreased |
| Printing test | Transfer roller | — | Gradually thicker | Gradually thicker |
| | Charging roller | — | — | — |

| Component | | Comparison Example 15 | Comparison Example 16 |
|---|---|---|---|
| (A) | EPDM | 100 | 100 |
| | NBR | | |
| | SEEPS | 24.69 | 24.69 |
| | PP | 10 | 10 |
| | Crosslinking agent | 12 | 12 |
| | Softener | 174 | 174 |
| | Calcium carbonate | 30 | 30 |
| | Carbon black | 10 | 10 |
| (C) | Compatibilizing agent | | 6 |
| (B) | Conductive agent 1 | | |
| | Conductive agent 2 | | |
| | Conductive agent 3 | 25 | 25 |
| | Peroxide | 0.4 | 0.4 |
| | Crosslinking agent | 0.24 | 0.24 |
| | TPEE | 20 | 20 |
| (D) | Foaming agent | | |
| | Coating on surface of roller | | |
| | State of molding | Bad | Good |
| | Electric resistance value (Ω) of roller | — | $3 \times 10^8$ |
| | Stability at high temperature and humidity | — | Gradually decreased |
| Printing test | Transfer roller | — | Gradually thicker |
| | Charging roller | — | — |

Materials used are as shown below:

EPDM oil-extended at 100% was used. The amount of the oil of the oil-extended EPDM is included in the mixing amount of the softener shown in the tables. In the tables, only the value of the rubber component is shown in the space of the EPDM. When the EPDM was used at 100 parts by mass and the softener was used at 174 parts by mass, the extended oil deriving from the oil-extended EPDM was used at 100 parts by mass and the remaining softener commercially available shown below was used at 74 parts by mass.

EPDM: "Esprene 670F (commercial name)" produced by Sumitomo Chemical Co, Ltd. (paraffin oil 100% oil-extended)

NBR: "DN401LL (commercial name)" produced by Zeon Corporation

SEEPS: hydrogenated styrene thermoplastic elastomer ("Septon 4077 (commercial name)" produced by Kuraray Co., Ltd.)

PP: polypropylene resin ("Novatech PP (commercial name)" produced by Japan Polychem Corporation)

Crosslinking agent: resinous crosslinking agent consisting of halogenated alkylphenol ("TACKROL 250-III (commercial name)" produced by TAOKA CHEMICAL CO., LTD.)

Softener: paraffin oil: "Diana process oil PW-380 (commercial name)" produced by Idemitsu Kosan Co., Ltd.

Calcium carbonate: "BF300 (commercial name)" produced by Shiraishi Calcium Kaisha, Ltd.

Carbon black: "SEAST 3 (commercial name)" produced by Tokai Carbon Co., Ltd.

Compatibilizing agent: ethylene-acrylic ester-maleic anhydride copolymer ("Bondine LX4110 (commercial name)" (produced by Arkema Co., Ltd.)

Conductive agent 1: EO-PO-AGE copolymer ("ZSN 8030 (commercial name)" produced by Zeon Corporation) and trifluoromethanesulfonic lithium (produced by Sanko Chemical Co., Ltd.), mixing ratio between EO-PO-AGE copolymer and trifluoromethanesulfonic lithium was 9:1 in mass ratio.

Conductive agent 2: polyether polyolefin copolymer ("PELESTAT 300 (commercial name)" produced by Sanyo Chemical Industries, Ltd.) and trifluoromethanesulfonic lithium (produced by Sanko Chemical Co., Ltd.), mixing ratio between polyether polyolefin copolymer and trifluoromethanesulfonic lithium was 20:1 in mass ratio.

Conductive agent 3: polyether block amide copolymer ("IRGASTAT P18 (commercial name)" produced by Chiba-Specialty-Chemicals Co., Ltd.) and trifluoromethanesulfonic lithium (produced by Sanko Chemical Co., Ltd.), mixing ratio between polyether block amide copolymer and trifluoromethanesulfonic lithium was 9:1 in mass ratio.

Peroxide: di(tert-butyl peroxy)diisopropyl benzene ("PERBUTYL P (commercial name)" produced by NOF Corporation)

Crosslinking assistant: N,N'-m-phenylene bismaleimide ("Actor PBM-R (commercial name)" produced by KAWAGUCHI CHEMICAL INDUSTRY CO., LTD.)

TPEE: polyester thermoplastic elastomer ("Hytrel 3078 (commercial name)" produced by Du Pont-Toray Co., Ltd.)

Foaming agent: "MB170EVA65 (commercial name)" (produced by Matsumoto Yushi Seiyaku Co., Ltd.)

The producing method is as described below.

Used as the component (A) consisting of the base polymer was the thermoplastic elastomer composition (SEEPS) in which the EPDM or/and the NBR were dynamically crosslinked with the resinous crosslinking agent and dispersed in the mixture of the styrene thermoplastic elastomer (SEEPS) and the polypropylene resin (PP) was used.

The EPDM and the NBR were pelletized. The pelletized EPDM or/and NBR, the styrene thermoplastic elastomer, the polypropylene resin, the crosslinking agent, and the softener were mixed with one another at the mixing ratio shown in the tables. After the components were dry-blended by a tumbler, the components were kneaded at 200 rpm and at 200° C. by using a twin-screw extruder ("HTM 38 (commercial name)" produced by I-pec Inc.) to form a pellet of the thermoplastic elastomer composition.

The following components were mixed with one another at the mixing ratio shown in the tables. The components were the obtained pelletized thermoplastic elastomer composition, the calcium carbonate, the carbon black, the ethylene-acrylic ester-maleic anhydride copolymer serving as the compatibilizing agent, the ionic-conductive agent, the polyester thermoplastic elastomer (TPEE) which is used if necessary, and additives (which are used if necessary) such as the peroxide, the crosslinking assistant, and the foaming agent. After the components were dry-blended by a tumbler, they were kneaded at 200 rpm and at 200° C. by using the twin-screw extruder ("HTM 38 (commercial name)" produced by I-pec Inc.) to obtain the pellet of the conductive thermoplastic elastomer composition of the present invention.

The obtained pellet of the conductive thermoplastic elastomer composition was tubularly extruded by using a single-screw extruder ($\phi$50 extruder produced by San NT Inc.) at 20 rpm and at 200° C. to obtain a molding of each of the examples and the comparison examples having an outer diameter of 12 mm and an inner diameter of 5 mm.

A shaft was inserted into each of the obtained tubes to obtain the conductive rollers of the present invention.

A coating was formed on the surface of the conductive roller of each of the examples 7, 8, 16, 17, 24, and 25. More specifically, a coating additive ("JLY-009 (commercial name)" produced by Acheson Japan Ltd.) was sprayed thereon. Thereafter the coating additive was baked at 150° C. for 10 minutes.

Measurement of Electric Resistance Value of Roller

The following examinations were conducted on the obtained conductive rollers.

Figure 2:
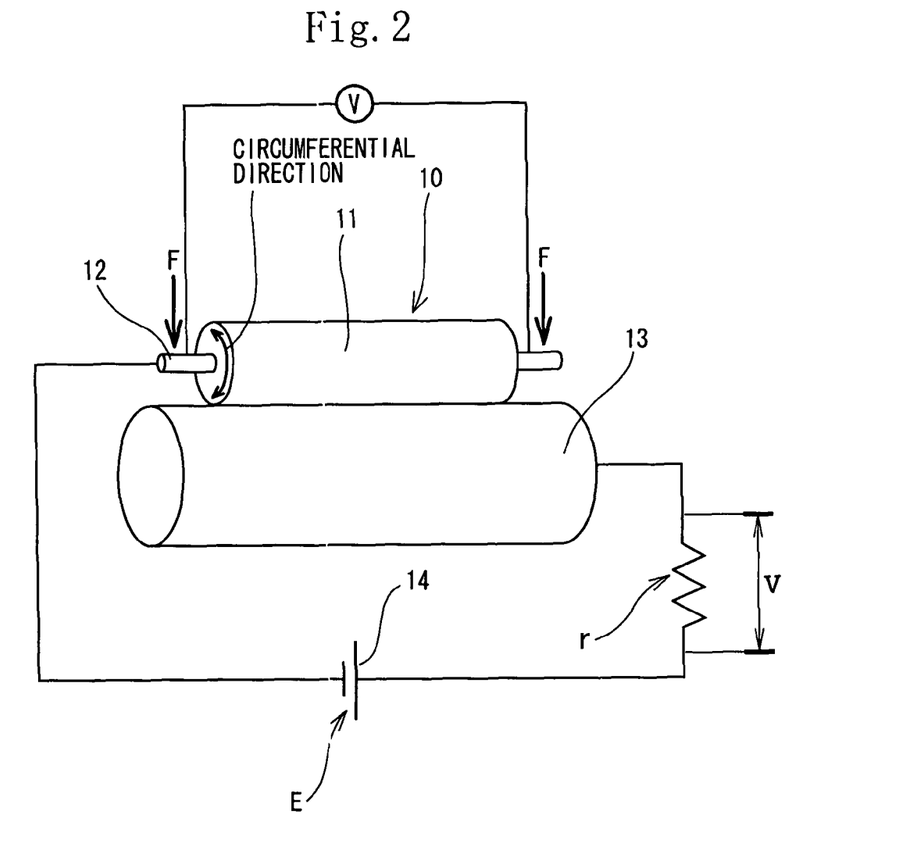
FIG. 2 is a schematic view showing an apparatus for measuring an electric resistance value of the conductive roller shown in FIG. 1.

As Shown in FIG. 2, in an atmosphere having a temperature of 23° C. and a relative humidity of 55%, a roller part 11 of a conductive roller 10 having a shaft 12 inserted therethrough was mounted on an aluminum drum 13 having $\phi$30 mm, with the conductive roller 10 in contact with the aluminum drum 13. The leading end of a conductor, having an internal resistance of r (100 to 10 k$\Omega$), which was connected to the positive side of a power source 14 was connected to one end surface of the aluminum drum 13. The leading end of a conductor connected to the negative side of the power source 14 was connected to one end surface of the shaft 12. A load of 500 g was applied to both ends of the shaft 12. The conductive roller 10 was indirectly rotated by rotating the aluminum drum 13, with a voltage of 1000V being applied between the shaft 12 and the aluminum drum 13. After the electric resistance was measured 36 times in the circumferential direction of the conductive roller 10, an average value was computed. The value of the internal resistance r was so adjusted that significant digits of a measured value was as large as possible, according to a level of the electric resistance value of the conductive roller. Supposing that a voltage applied to the apparatus is E, the electric resistance value R of the conductive roller 10 is: R=r×E/(V−r). Because the term of (−r) is regarded as being slight, R=r×E/V. The electric resistance value R of the roller 10 was computed from a detected voltage V applied to the internal resistance r. Tables show the average value of the electric resistance value of each conductive roller 10 by common logarithm.

Stability at High Temperature and Humidity

The conductive rollers were stored at a high temperature of 30° C. and a high relative humidity of 80%. The electric resistance values of conductive rollers were measured by the above-described method a week later. The electric resistance values thereof were measured every one week with the conductive rollers stored at the high temperature and the high humidity for one month.

Conductive rollers whose electric resistance values gradually decreased within one month and were unstable were evaluated as "gradually decreased". Conductive rollers whose electric resistance values were stable were evaluated as "unchanged".

Of the conductive rollers whose electric resistance values became stable within one month, those of the examples 2, through 25 were evaluated on the stability of the electric resistance values thereof at the high temperature and humidity, as described below. Results are shown in the tables.

The conductive rollers were stored for one day at the high temperature of 30° C. and the high relative humidity of 80%. Thereafter the electric resistance values thereof were measured by the above-described method. Normally, when the conductive rollers are subjected to a high temperature and a high relative humidity, the electric resistance values thereof become lower. The conductive rollers were stored for one day at the high temperature and the high humidity and the electric resistance values thereof were measured until the electric resistance values thereof did not drop and became stable at a constant value.

The number of days until the electric resistance value of each roller became stable is shown in the tables. Conductive rollers whose electric resistance values became stable in fewer days were more favorable than those whose electric resistance values became stable in more days. More specifically, conductive rollers whose electric resistance values became stable within three days were evaluated as being favorable. conductive rollers whose electric resistance values became stable within one day were evaluated as being especially favorable.

Printing Test

The conductive rollers of the examples and the comparison examples were mounted on a printer ("C5200n" manufactured by Oki Data Co., Ltd.) commercially available or an attachment cartridge (black) as a transfer roller or a charging roller.

Printing was performed on 50 sheets at a temperature of 23° C. and a relative humidity of 55%. Printing density and unevenness of printing of the 50 sheets were visually checked.

As apparent from the tables, in the conductive thermoplastic elastomer composition of the comparison examples 1, 4, 6, 7, 10, 12, and 15 not containing the ethylene-acrylic ester-maleic anhydride copolymer serving as a compatibilizing agent, the ionic-conductive agent did not compatibilize. Thus the conductive thermoplastic elastomer composition could not be extruded.

In the conductive thermoplastic elastomer composition of the comparison examples 2, 3, 5, 8, 9, 11, 13, 14, and 16 using polymers other than the EO-PO copolymer or/and the EO-PO-AGE copolymer contained in the ionic-conductive agent, although extrusion molding could be made favorably, the stability of the electric resistance values thereof at the high temperature and humidity was unfavorable, i.e., the electric resistance values thereof became gradually low. When they were incorporated in the printer as the transfer roller, printing concentration gradually became thicker. Thus it was confirmed that they left room for improvement to such an extent they can be put into practical use.

On the other hand, the conductive thermoplastic elastomer compositions of the examples could be extruded favorably, and the stability of the electric resistance values thereof at the high temperature and humidity was favorable. Thus the electric resistance values thereof did not change. When the conductive rollers were incorporated in the printer as the transfer roller or the charging roller, printing concentration was stable. Thus it was confirmed that they could be reliably put into practical use.

The conductive rollers of the examples 7, 8, 16, 17, 24, and 25 on which the coating was formed had a low coefficient of friction.

The conductive thermoplastic elastomer compositions of the examples 10 through 25 containing the polyester thermoplastic elastomer became stable more rapidly in the electric resistance values thereof than that of the conductive thermoplastic elastomer composition of the example 2 which did not contain the polyester thermoplastic elastomer and were very stable in the electric resistance values thereof at the high temperature and humidity. It was confirmed that the conductive roller composed of the conductive thermoplastic elastomer composition containing the polyester thermoplastic elastomer was very stable at the high temperature and humidity.

What is claimed is:

1. A conductive thermoplastic elastomer composition comprising:
    a component (A) comprising a thermoplastic elastomer composition containing a mixture of an olefin resin and a styrene thermoplastic elastomer and at least one rubber component selected from the group consisting of EPDM and NBR dynamically crosslinked and dispersed in the mixture of the olefin resin and the styrene thermoplastic elastomer;
    a component (B) comprising an ionic-conductive agent containing an ethylene oxide-propylene oxide-allyl glycidyl ether copolymer and a metal salt, composed of metal cations and anions having a fluoro group and a sulfonyl group, contained in said ethylene oxide-propylene oxide-allyl glycidyl ether copolymer; and
    a component (C) comprising an ethylene-acrylic ester-maleic anhydride copolymer;
    wherein a mixing ratio between the olefin resin and the styrene thermoplastic elastomer of the component (A) is 30 to 50 parts by mass of the olefin resin mixed with 100 parts by mass of the styrene thermoplastic elastomer;
    wherein 200 to 400 parts by mass of the at least one rubber component is mixed with 100 parts by mass of the mixture of the olefin resin and the styrene thermoplastic elastomer; and
    wherein the conductive elastomer composition contains 20 to 40% of the component (B) in a volume fraction.

2. The conductive thermoplastic elastomer composition according to claim 1, further comprising a component (D) consisting of a polyester thermoplastic elastomer.

3. The conductive thermoplastic elastomer composition according to claim 1, wherein said dynamic crosslinking is performed by using a resinous crosslinking agent.

4. The conductive thermoplastic elastomer composition according to claim 1, wherein said ethylene oxide-propylene oxide-allyl glycidyl ether copolymer of said component (B) is dynamically crosslinked by a peroxide.

5. A method of producing the conductive thermoplastic elastomer composition according to claim 1, wherein before said component (A) and said component (B) are mixed with each other, said component (A) is dynamically crosslinked.

6. A molding obtained by molding the conductive thermoplastic elastomer composition according to claims 1.

7. A molding obtained by subjecting the conductive thermoplastic elastomer composition according to claim 1 to expansion molding.

8. A molding, obtained by molding the conductive thermoplastic elastomer composition according to claim 1, which is used as a conductive roller.

9. The molding according to claim 6, which is surface-treated.

* * * * *